June 13, 1944.    R. B. FULLER    2,351,419
BUILDING CONSTRUCTION
Filed April 9, 1941    7 Sheets-Sheet 1

INVENTOR
Richard Buckminster Fuller
BY
ATTORNEY

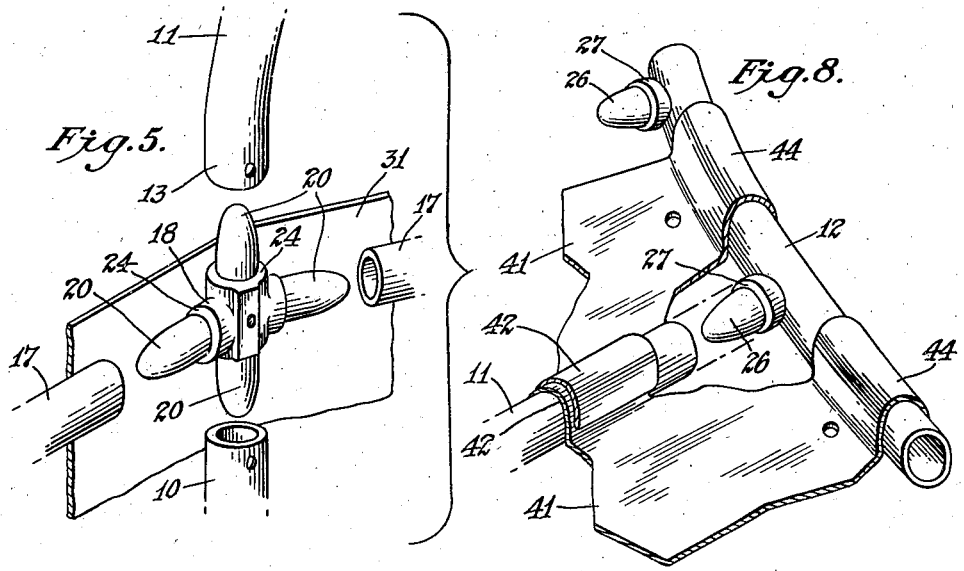
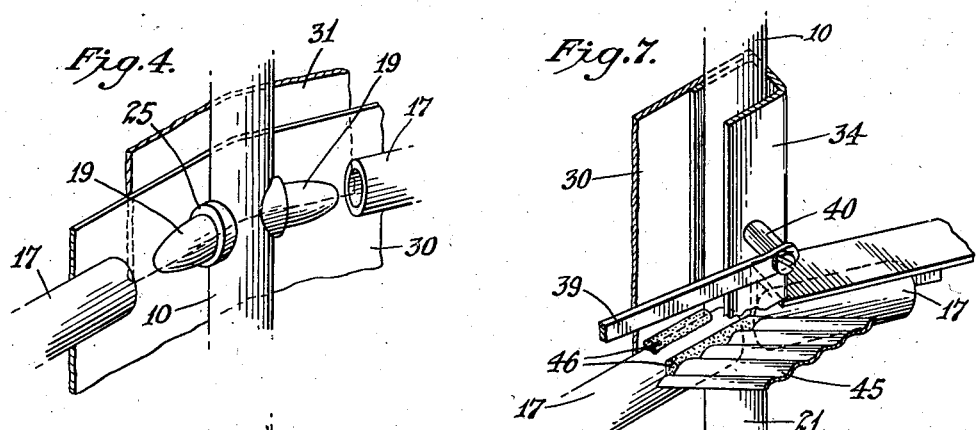
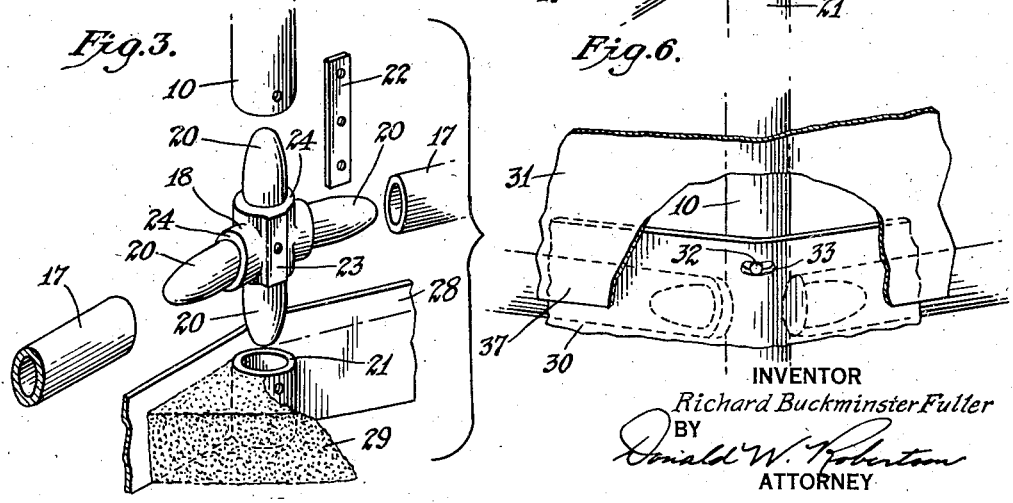

June 13, 1944.  R. B. FULLER  2,351,419
BUILDING CONSTRUCTION
Filed April 9, 1941    7 Sheets-Sheet 3

INVENTOR
Richard Buckminster Fuller
BY
ATTORNEY

June 13, 1944.   R. B. FULLER   2,351,419
BUILDING CONSTRUCTION
Filed April 9, 1941   7 Sheets-Sheet 4

INVENTOR
Richard Buckminster Fuller
BY
ATTORNEY

June 13, 1944.   R. B. FULLER   2,351,419
BUILDING CONSTRUCTION
Filed April 9, 1941   7 Sheets-Sheet 5
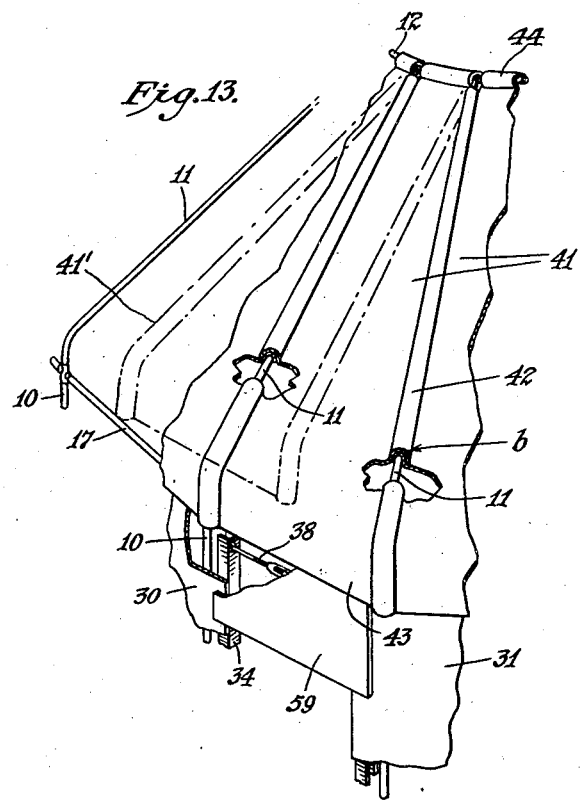
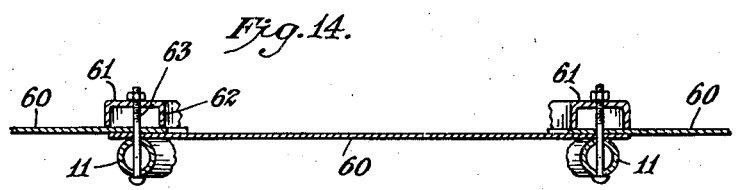
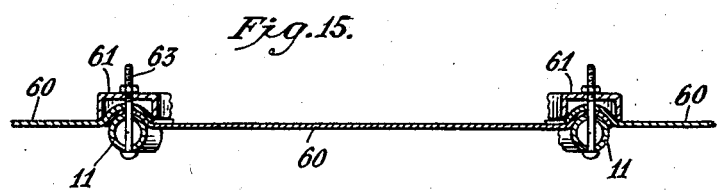
INVENTOR
Richard Buckminster Fuller
BY
ATTORNEY

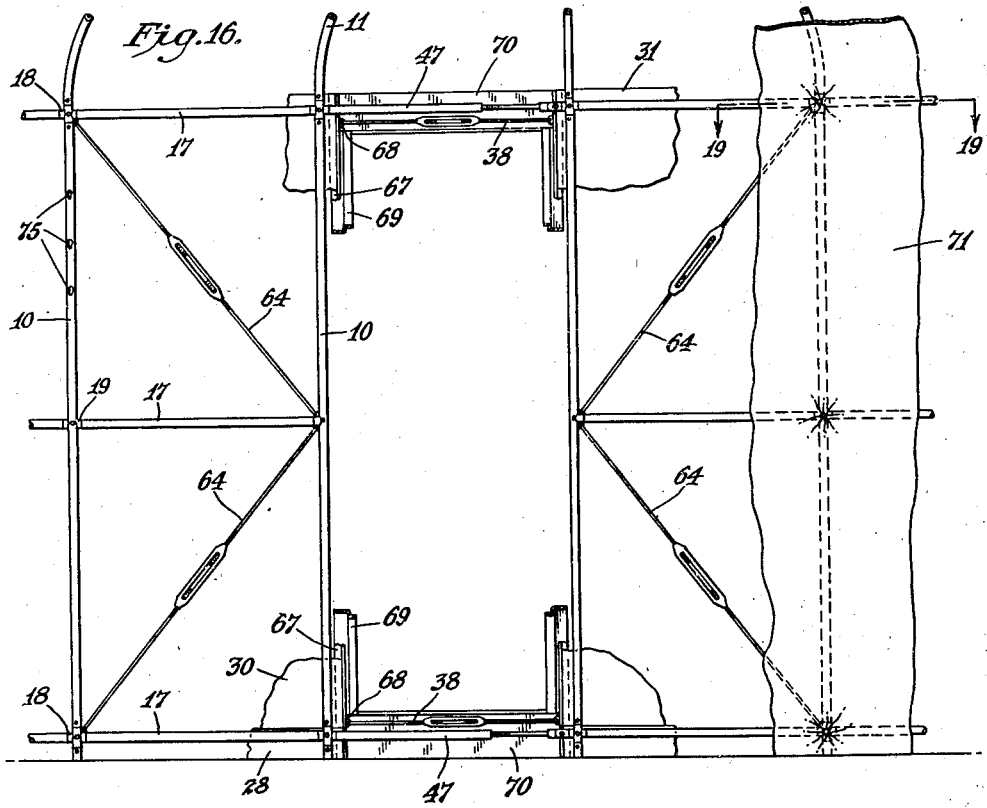
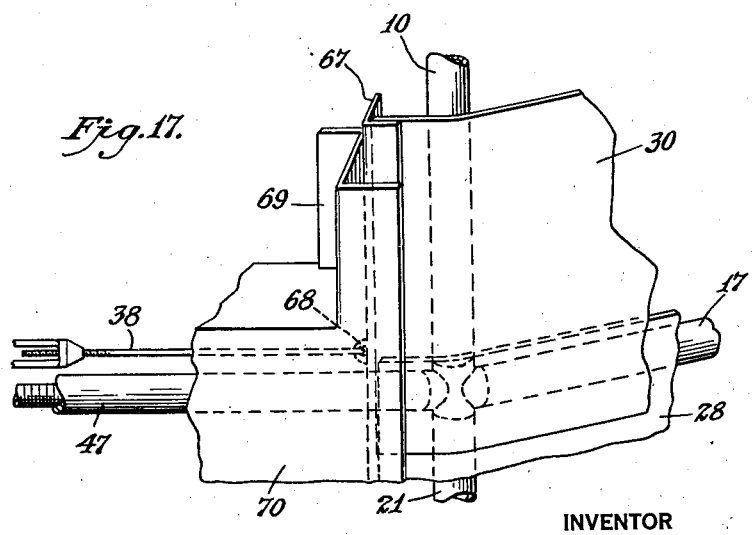

June 13, 1944.                R. B. FULLER                2,351,419
                          BUILDING CONSTRUCTION
                   Filed April 9, 1941          7 Sheets-Sheet 7
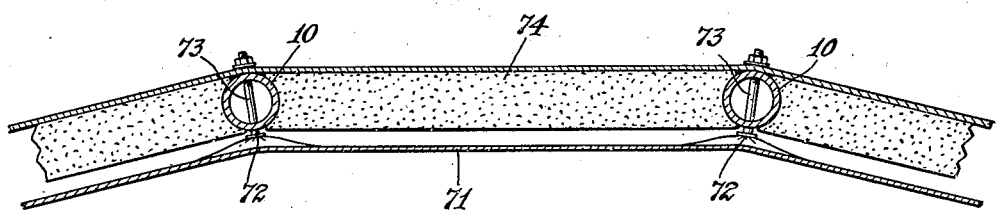
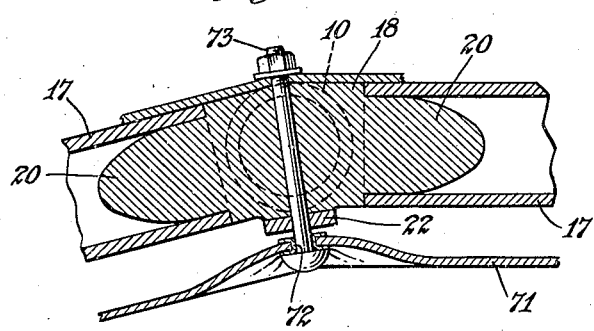
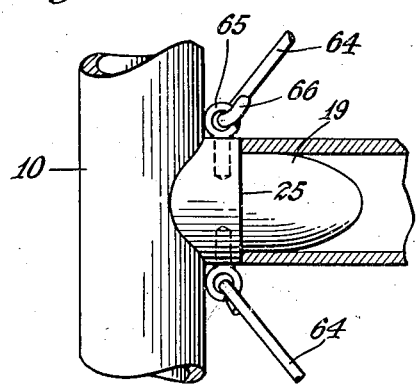
INVENTOR
*Richard Buckminster Fuller*
BY
ATTORNEY Patented June 13, 1944

2,351,419

UNITED STATES PATENT OFFICE 2,351,419

BUILDING CONSTRUCTION

Richard Buckminster Fuller, New York, N. Y., assignor to The Dymaxion Company, Inc., Wilmington, Del., a corporation of Delaware Application April 9, 1941, Serial No. 387,589

3 Claims. (Cl. 189—1)

The invention relates to the fabrication of structures suitable for small houses, or for storage bins and the like, and more particularly to structures of this class which have walls of sheet metal or other sheet material arranged to form a shell or enclosure which is of substantially cylindrical form.

It is an object of my invention to fabricate structures of the class described in such a manner that the walls of sheet metal or other material can be of extremely light gauge by reason of distribution of stresses throughout the entire structure.

A further object of my invention is to provide a stressed-wall structure in combination with a semi-flexible supporting framework so as to segregate tensile and compression forces in such a manner that tensile forces are confined substantially entirely to the wall covering whereas compression forces are confined substantially entirely to the supporting framework.

Another object is to make possible the rapid erection of metal structures at low cost for both material and labor.

Another object is to provide a structure of the class described which can be readily taken down and transported to another location for erection there.

Another object is to provide improved means for utilizing the strength characteristics of both the inner and outer wall coverings in structures of the type referred to.

A still further object is to provide means inherent in the walls and roof of structures of the class described for controlling or modifying convection currents within the structure.

Other objects and advantages will appear as the description proceeds.

In the drawings:

Fig. 1 is a diagrammatic side elevational view of the compression frame used in a preferred embodiment of my invention; and Fig. 2 is a diagrammatic top plan view of the same frame, but with the ventilator removed.

Figs. 3 to 8, inclusive, are detail views showing the manner in which the structure of Figs. 1 and 2 is assembled, and how the outer stressed covering is draped thereon.

Fig. 3 is an exploded view of the joint indicated within the area of circle 3 on Fig. 1, looking from within the structure. Fig. 4 is a similar view of the joints indicated within the circles 4 on Fig. 1, and Fig. 5 is a similar view of the joint indicated within the circle 5 on Fig. 1.

Fig. 6 is a detail view covering that portion of the structure indicated within either of the circles 4 shown on Fig. 1, being a fragmentary elevational view looking at the exterior of the structure, and indicating the manner of draping the outer stressed covering on the framework.

Fig. 7 is a detail elevational view covering that portion of the structure indicated within the circle 7 shown on Fig. 1, and shows the door jamb and sill; also a portion of the flooring.

Fig. 8 is a detail view covering that portion of the structure indicated within the circle 8 shown on Fig. 1, and shows one manner of applying the roof sections to the framework.

Fig. 11 shows the relative position of the parts before the covering has been stressed, and Fig. 12 shows their relative position after the covering has been stressed.

Fig. 13 is a detail perspective view showing one form of roof construction.

Figs. 14 and 15 are detail transverse vertical sectional views illustrating a modified form of roof construction in which the roof covering sheets are stressed. Fig. 14 shows the arrangement of the parts before the covering sheets have been stressed, and Fig. 15 shows the completed roof section.

Fig. 16 is a detail elevational view of a modified construction looking from the inside of the structure at the doorway and adjacent panels.

Fig. 17 is a detail perspective view looking from the outside of the same structure at a lower corner of the doorway.

Fig. 18 is a horizontal sectional view through a portion of the wall structure illustrated in Fig. 16, showing the manner of applying the insulation and interior wall covering thereto.

Fig. 19 is a detail horizontal sectional view taken as indicated at 19—19 in Fig. 16.

Fig. 20 is a detail view showing the manner of attaching the reinforcing strut members shown in Fig. 16.

One of the features of my invention resides in providing a more or less flexible supporting frame over which covering sheets are draped and then stressed under considerable tension. With such a construction the tensile and compression forces are segregated in such a manner that the tensile forces are confined substantially entirely to the covering sheets, whereas compression forces are confined substantially entirely to the supporting frame. In its simplest embodiment, such a segregated compression and tension structure may consist of an annular ring with a sheet member adjacent said ring and wrapped around it, together with means for tensioning the sheet member to set up compression forces peripherally of the ring. The annular ring preferably is formed of a plurality of sections arranged end to end. The ring may be substantially circular or of other generally curved form, or it may be polygonal in form. In the several embodiments illustrated in the accompanying drawings, a plurality of such rings are arranged in substantial parallelism, and assembled with vertical members to form a cage-like structure over which the covering is stretched.

Referring to Figs. 1 to 9, inclusive, I shall describe one of the preferred embodiments which have been selected for the purpose of illustrating certain features of my invention. The construction shown in these views has been designed primarily for use as a storage unit, such as a grain bin or the like. The construction shown, however, is also applicable to the fabrication of houses, and my invention is not to be understood as being restricted to any particular field of use.

Figure 1:
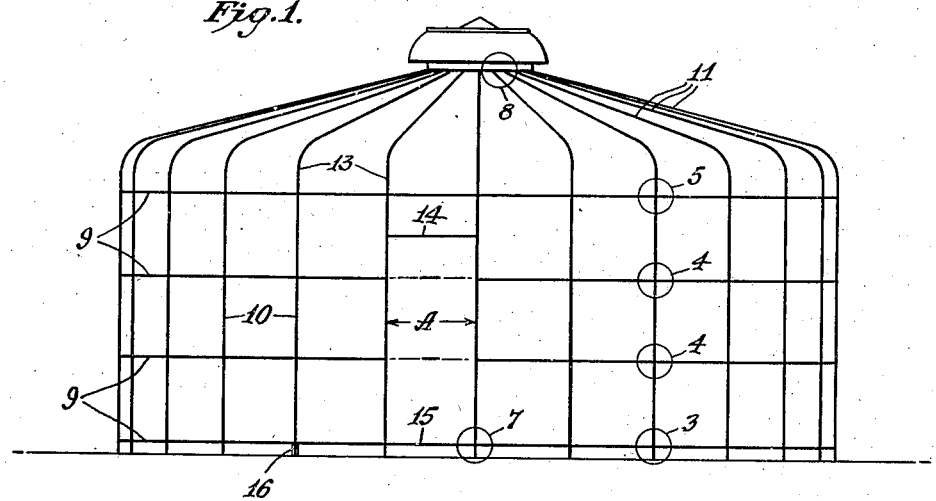
Figure 2:
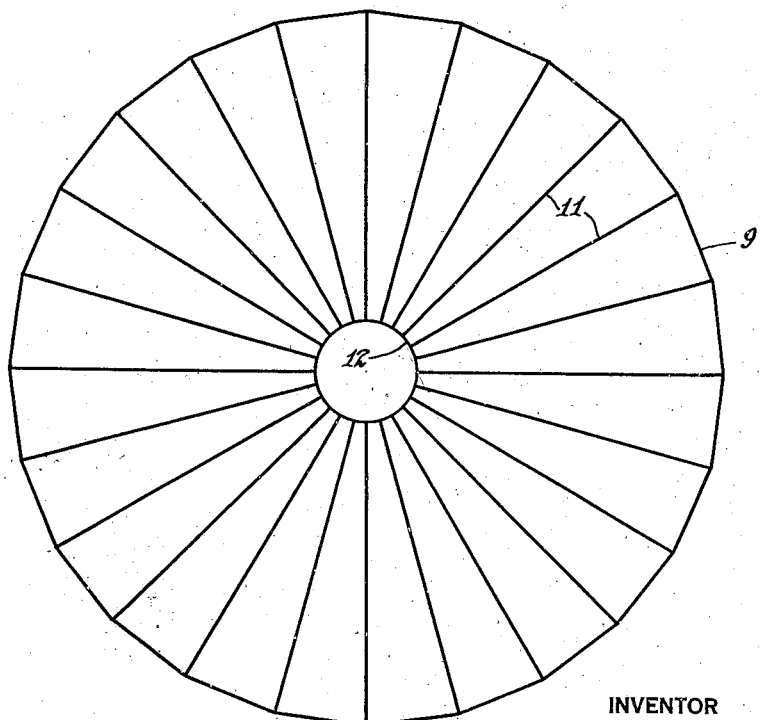

In Figs. 1 and 2, the supporting framework is illustrated diagrammatically, the constructional details of the various portions of this framework being shown in Figs. 3 to 9, inclusive. In its general arrangement, this framework consists of the polygonal or substantially circular horizontal ring members 9, intersecting vertical members 10, and inclined radial roof supporting members 11. The roof supporting members 11 at their inner ends abut a compression ring member 12 (Fig. 2), and at their outer ends are preferably curved downwardly, terminating in vertical sections 13 for alignment with the vertical members 10. The top and bottom ring members 9 are continuous, but the two intermediate ring members 9 may have an open section to provide a doorway or the like, as at A. The top of the doorway is indicated at 14 and the sill at 15. A jack 16 may be provided under the end of each vertical member 10 for the purpose of leveling the structure.

The annular rings 9 preferably are formed of a plurality of sections arranged end to end with suitable means for holding them in alignment. Figs. 3, 4 and 5 illustrate my preferred form of aligning means. These views should be considered in conjunction with Fig. 1 wherein the circles 3, 4 and 5 indicate the respective portions of the structure which are illustrated in more detail in Figs. 3, 4 and 5. In the detail views the parts have been shown separated, or "exploded," in order to more clearly illustrate the manner in which they are assembled. In these three views, the horizontal ring members 9 are made up of a series of straight tubular sections 17 joined together by cross-shaped connecting members 18 (Figs. 3 and 5), or by studs 19 on the vertical member 10 (Fig. 4). The cross-shaped connecting members 18 also serve to connect the horizontal sections 17 to the ends of the vertical members 10 and to the vertical portions 13 of the roof members 11. The intermediate joints 4 may, if desired, be constructed in the same manner as the lower and upper joints 3 and 5, but in the construction shown in Fig. 4 the vertical member 10 is shown as being constructed in a single piece.

The cross-shaped connecting members 18 have projecting dowels 20 which fit within the ends of the members 10, 11 and 17, and also within the end of a tubular member 21, shown in Fig. 3, which may be driven into the ground to provide a support beneath the column formed by the vertical member 10. There is one of these supporting members 21 for each of the vertical members 10, and the first step in the erection of the structure consists in driving the tubular supporting members 21 into the ground, preferably with the use of a centering plug placed within the upper end of the member 21. After the members 21 have been driven so that their top faces are brought to a common level, the elements 17 and 18 of the lowermost ring member 9 are assembled on the foundation thus provided. In a similar manner, the vertical members 10 and the elements of the intermediate and upper ring members 9 are assembled to complete the formation of a substantially cylindrical or prismatic framework. The ends of the projections 20 of the cross members 18 are rounded, as shown, to facilitate assembly, and also to provide a certain amount of flexibility in the completed structure. If desired, the members 10, 11 and 21 may be held in assembled relationship with the crosses 18 by any suitable fastening means such as the strap 22 shown in Fig. 3, which has three holes arranged for alignment with tapped holes in the cross member 18, and in the members 10 and 21 (or 10 and 13). The cross member 18 may be provided with a flat inner face 23 against which the plate 22 is brought to bear by the machine screw which passes through the center hole of the strap 22. Machine screws passing through the end holes of the strap 22 engage the tapped holes in the ends of the member 10, and the end of the member 13 or 21, as the case may be. The cross members 18 preferably are constructed with shoulders 24 so as to bring the body portion of the member 18 into flush alignment with the outer surfaces of the members 10, 11, 17 and 21.

The studs 19 shown in Fig. 4 may be welded or otherwise secured to the vertical tubular member 10 and preferably are tapered similar to the studs 20 of the cross members 18 so as to provide a certain amount of flexibility in the completed structure, and also to assist in its assembly. The studs 19 likewise are formed with shoulders 25 so that the attaching portions of these studs come into flush alignment with the outer surfaces of the sections 17.

The connection between the roof members 11 and the compression ring 12 is illustrated in Fig. 8. The ring 12 is provided with studs 26 similar in construction to the studs 19 which have been described with reference to Fig. 4. These studs may be welded or otherwise secured to the ring 12. The inner ends of the tubular roof members 11 fit around the ends of these studs, and are forced against the shoulders 27 thereof when the outer wall covering is stretched over the cylindrical walls of the frame. The ring 12 in conjunction with the roof members 11, thus serve to true up the completed structure.

After the supporting foundation members 21 have been driven and leveled, a band or strip 28 of metal or other suitable material is wrapped around the outside of the members 21 as shown in Fig. 3. This may be done after the rest of the framework has been assembled. With the strip 28 in place, the foundation of the structure is filled to the desired level, as indicated at 29. The fill 29 may be of earth, or of any other material desired. Then, after the framework has been assembled in the manner previously described, the wall covering sheets 30 and 31 are draped on the structure. For this purpose, the vertical members 10 are provided with outwardly projecting studs 32 (Fig. 6) for engagement with slots 33 formed in the sheets 30 and 31. The engagement of the slots in the sheets with the studs 32 serves to support the sheets in the proper position during their application, while allowing relative movement between the sheets and the vertical members 10 during the operation of stressing the covering sheets. The ends of the sheet members are secured to vertical members such as the channels 34 (Figs. 7 and 9), as by welding or bolting the sheets thereto. The channel 34 hooks over one of the vertical members 10, holding one end of the sheet as it is wrapped around the structure to have its opposite end secured to another channel 34 at the adjacent vertical member 10. Application of the covering sheets 30 and 31 may be facilitated by having the sheets delivered in roll form and, if desired, the slots 33 may be punched prior to application of the sheet. The rolled sheet may be mounted on a spindle 35 carried by a hand truck 36 on which it is rotatably mounted. As the truck is pushed or pulled around the structure, the sheet unrolls and the slots 33 brought into proper registration with the studs 32 in the framework. The lower sheet 30 is applied first, and the upper sheet 31 overlaps the lower sheet, as at 37, to provide proper protection against the weather.

The covering sheets 30 and 31 may be made of light gauge metal, reinforced plastic, plywood, canvas, or any sheet material capable of withstanding moderate tensile stresses.

After the covering sheets have been loosely draped on the structure, the vertical members 34 are drawn towards one another by means of turnbuckle rods 38, the ends of which are suitably secured to the channels 34. As will be seen in Fig. 9, the sections 17 of the uppermost and lowermost compression rings 9 extend across the opening between the ends of the covering sheets. The back and one flange of the channels 34 are cut away so as to avoid interference with these sections 17. As the turnbuckle rods 38 are tightened to draw the channels 34 toward one another, the rings 9 are placed under compression, holding the sections 17 and 18 thereof in assembled relationship. The vertical members 10 adjacent the channels 34 are prevented from being drawn toward one another by reason of the fact that the uppermost and lowermost compression rings are continuous. Therefore, as the channel members 34 are drawn toward one another, the vertical members 10, which are surrounded by the flanges of these channel members (Fig. 7), are held apart by the sections 17 of the compression rings which extend across the same space that is occupied by the turnbuckle rods. Since the pull applied by the turnbuckle rods is not directly in line with the plane of the covering sheets, a turning moment is applied to the channels 34 in a direction about an axis which parallels the length thereof. This turning moment is resisted by a second set of turnbuckle rods 39 which are secured at one end to the vertical member 10 at the end of the adjacent panel, and at their other ends to studs 40 (Figs. 7 and 9) rigidly secured to one side of the channel 34. It will be seen that by properly adjusting the turnbuckles 38 and 39, proper alignment of the channels 34 may be secured.

The roof covering may consist of a plurality of segments 41 having curved flanges 42 adapted to extend over the roof supporting members 11. The roof segments 41 are provided with downwardly extending flanges at their outer ends arranged to overlap the top of the wall as at 43. At their inner edges, the roof segments are provided with flanges 44 adapted to extend over the compression ring 12.

In Fig. 7 I have shown an illustrative section of corrugated flooring 45. Asphalt mastic 46 or other suitable material may be used to seal the joints between the flooring and the ring sections 17 and between the ring sections 17 and the covering sheet 30.

Figure 10:
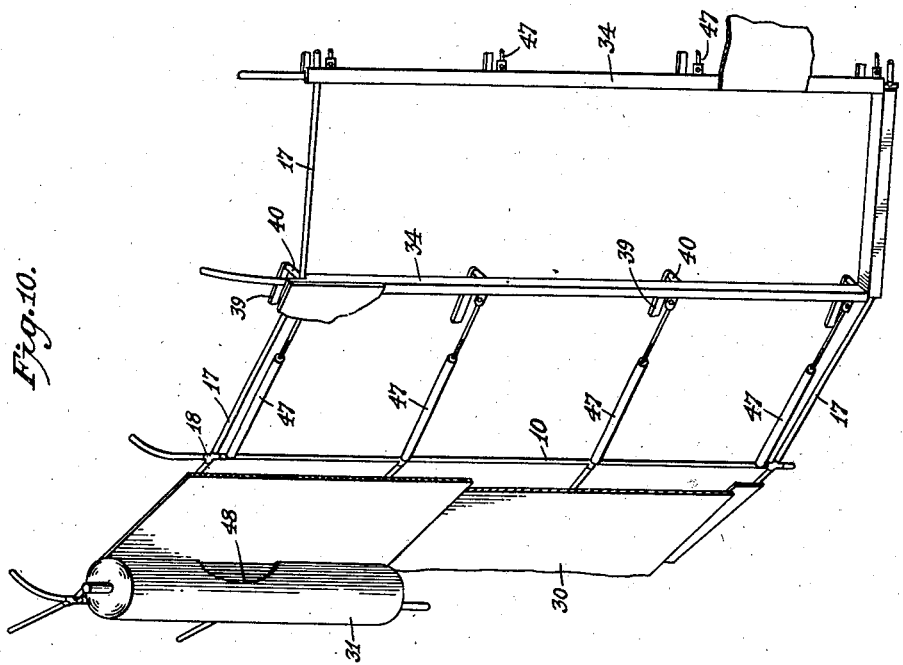
Fig. 10 is a perspective view similar to Fig. 9, but showing another embodiment of the invention in which the means for stressing the cover sheets are so arranged as to leave a doorway free from obstruction.

In Fig. 10 I have shown a modified form of my invention which is particularly suited for the construction of houses, where an opening for a full height door must be left free from obstruction by turnbuckles or the like. The construction of this embodiment is the same as that which has been described insofar as concerns the arrangement of the supporting framework and the wall covering sheets 30 and 31. Also, the ends of the wall covering sheets are attached to channels 34 in the manner which has been described with reference to Fig. 9. However, in place of the turnbuckle rods 38 I employ a series of jacks 47 arranged in the panel adjacent the doorway. As shown, there is a set of these jacks 47 at each side of the doorway so that the take-up in stretching the covering sheets may be distributed evenly around the structure. However, if desired, the jacks may be omitted at one side of the doorway, in which case the channel 34 at that side will simply be drawn up tightly against the vertical member 10 so that all of the stretch may be taken up at the other side. The two intermediate jacks 47 bear at one end against the vertical members 10 at the studs 19, and at the other end bear against the flanges of the channel 34. The lowermost and uppermost jacks 47 are arranged adjacent the compression ring sections 17. Thus, just as has been described with reference to the embodiment of Fig. 9, the uppermost and lowermost horizontal compression rings 9 are continuous, i. e., they extend completely around the structure and prevent it from collapsing when the sheets are stretched thereover by means of the jacks 47. Turnbuckle rods 39 attached at one end to one of the vertical members 10, and at the other end to a stud 40 on the channel 34, cooperate with the jacks 47 and, when properly adjusted, balance the turning moment on the channel 34, as has been described with reference to Fig. 9. If desired, window openings 48 may be preformed in the covering sheet 31.

Figure 11:
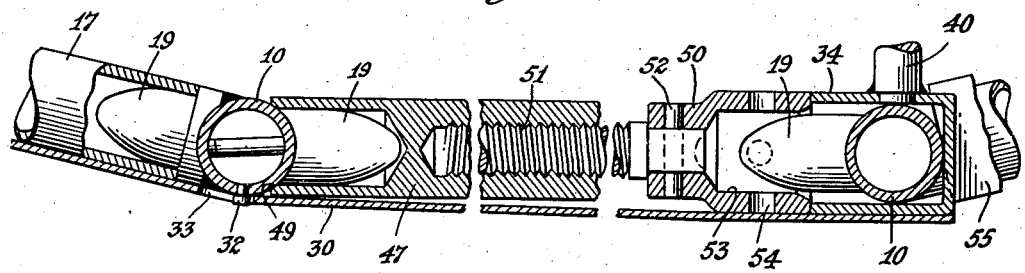
Figs. 11 and 12 are detail horizontal sectional views of the means for stressing the covering sheets employed in the embodiment illustrated in Fig. 10.
Figure 12:
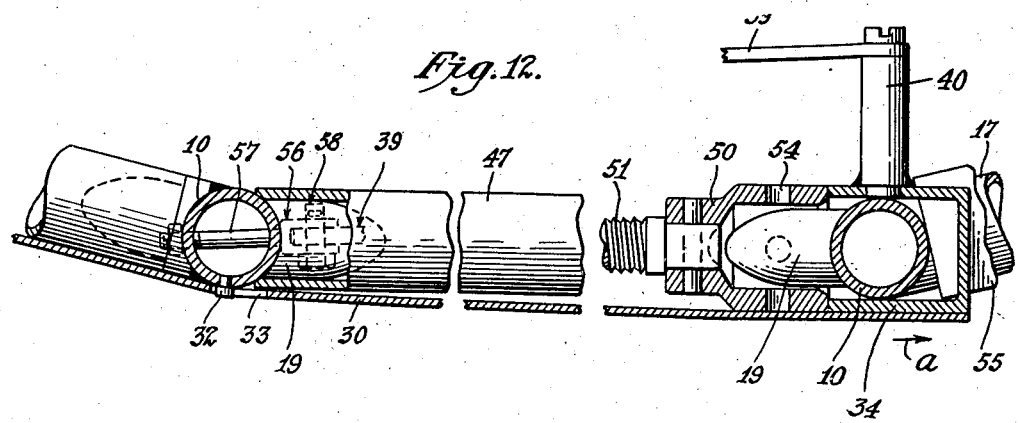

It will be understood that the tensioning of the covering sheets is accomplished with very little relative movement between the two channel members 34. The action of the jacks 47 in tightening the covering sheet 30 is illustrated in Figs. 11 and 12, Fig. 11 showing the relative position of the parts before tightening, and Fig. 12 their relative position after tightening. The jack 47 is recessed at one end to receive the dowel 19 secured to the vertical member 10. If desired, the base of the jack may be made arcuate in form, as at 49, for engagement with the vertical member 10 to prevent rotation of the base portion of the jack during its operation. The head 50 of the jack is keyed to the screw 51 thereof as by means of the pin 52, and is provided with a recess 53 arranged to surround the stud 19 of the adjacent vertical member 10. Apertures 54 are provided in the head 50 of the jack for engagement with a suitable tool for operating the jack. As the jacks are operated to draw the sheets 30 and 31 taut over the frame, the channel 34 moves to the right as indicated by the arrow $a$ in Fig. 12, but the position of the adjacent vertical member 10 remains substantially unchanged for it is held by the continuous compression rings at the top and bottom of the structure. As the channel 34 moves to the right as indicated in Fig. 12, its lower end slides over the top of the sill 55 without interference therewith.

The connection for the inner end of the turnbuckle rod 39 is shown in Fig. 12, and may comprise a shackle 56 secured to the vertical member 10 by means of a bolt 57, the end of the turnbuckle rod being received between the bifurcations of the shackle 56 and secured thereto by a pin and cotter 58.

Fig. 13 shows a detail of the construction of the roof for a grain bin or the like to provide an opening for loading and unloading or other purposes. The construction of the supporting framework may be the same as has been described with reference to Figs. 1 to 9, and as shown, comprises the tubular roof-supporting members 11 which extend radially of the structure, and the compression ring 12 to which the inner ends of the members 11 are secured. Each roof panel 41 spans the distance between two of the members 11, and is provided with marginal flanges 42 arranged for engagement with the members 11 or with the flanges of adjacent panels. The flanges 42 preferably are curved or bent over in such a manner as to provide an interlocking engagement between the flanges of adjacent panels, and an interlocking engagement with the members 11 as indicated at $b$ in Fig. 13. The flanges 42 of the central panel 41 shown in Fig. 13 overlie the flanges of the adjacent panels so as to permit the central panel to be raised in the manner indicated by the dot-dash lines 41', swinging about the compression ring 12 as a pivot. The engagement of the roof panels 41 with the ring 12 has been described with reference to Fig. 8. The dot-dash lines 41' in Fig. 13 show the central panel in only partially elevated position, and it will be understood that it may be swung upwardly to the extent which may be desired for loading operations. The panel 59 which completes the wall enclosure between the ends of the wall covering sheets 30 and 31 likewise may be removed to facilitate loading or unloading of the bin. If desired, the panel 59 may be connected to the downwardly extending portion 43 of the central roof panel so that when this panel is raised, the section 59 will be raised with it.

In Figs. 14 and 15 I have illustrated a modified form of roof construction to provide for stressing of the roof covering sheets. These are cross-sectional views taken transversely of one of the roof panels. The construction of the supporting framework may be similar to that which has been described comprising the tubular supporting members 11. In this embodiment of the invention, the covering sheets 60 may be flat sheets devoid of marginal flanges, as indicated in Fig. 14. Adjacent edges of the sheets 60 are arranged in overlapping relationship above the supporting members 11. A clamping element or batten 61 is placed above the overlapping portions of the sheets. The clamping element may be in the form of a channel in cross section so as to provide downwardly extending flanges 62 bearing against the overlapping edges of the sheets at each side of the supporting member 11. A series of clamping bolts 63 extend through the member 11, through the overlapping portions of the sheets 60, and the center of the clamping element 61. When the clamping bolts 63 are tightened, the overlapping portions of the sheets 60 are drawn down around the member 11, as indicated in Fig. 15. This action stresses the covering sheets because of the material taken up by wrapping the marginal edges of the sheets around the surface of the member 11. If desired, the bolts 63 which are nearest the center of the structure, may be tightened to a lesser extent than bolts which are toward the outside, so as to properly distribute the stress throughout the roof. Also, the tightening of the bolts 63 may be performed in such a manner as to regulate the clamping action of the elements 61 to stress the roof to approximately the same tension as the wall covering. The resulting even distribution of stresses throughout the entire structure makes it possible to employ lighter sections than would otherwise be possible.

In Figs. 16 to 20, inclusive, I have illustrated another embodiment of my invention which is more particularly adapted to the construction of houses or other structures in which it is desirable to provide a full height door opening. In this embodiment, the construction of the supporting framework may be substantially the same as has been described with reference to the preceding views, consisting of vertical walls members 10, horizontal compression rings made up of tubular sections 17, and roof members 11. However, only one intermediate compression ring is employed in place of the two rings 9 shown in Fig. 1. In this connection, I wish to make it clear that the number of intermediate rings is purely a matter of choice, and that, in the embodiment about to be described, one or more intermediate rings may be employed, as may be desired. The intermediate compression ring (or rings) does not extend completely around the structure because of the necessity of providing a full height door opening. The top and bottom compression rings do extend completely around the structure. However, at the doorway a jack 47 takes the place of one of the sections 17. Compression forces which are set up in the supporting framework upon stressing of the covering sheets are transmitted from the upper and lower compression rings to the intermediate compression ring by means of struts 64. These struts 64 preferably consist of turnbuckle rods so as to provide a suitable adjustment. The rods 64 may conveniently be secured at their ends to the cross-shaped connecting members 18 and studs 19 previously described. For this purpose, the members 18 and 19 may be tapped to receive eye-bolts 65 (Fig. 20) for engagement with eye-bolts 66 formed in the ends of the rods. The provision of the struts 64 makes it possible to utilize the compressive strength of the discontinuous intermediate compression ring.

Figure 9:
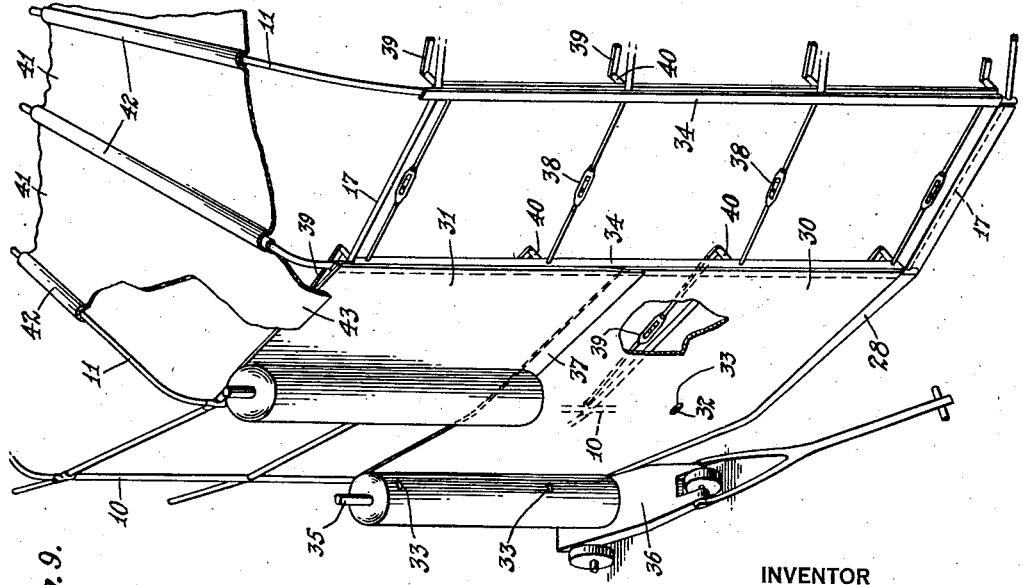
Fig. 9 is a perspective view of a portion of the structure illustrated in the preceding views, showing one manner of applying and securing the stressed covering sheets to the framework.

The wall covering sheets 30, 31 are applied in the manner which has been described with reference to Fig. 9. In this embodiment the ends of the sheets 30, 31 are welded or otherwise secured to angle members 67. Eye-bolts 68 are secured to the corners of the angle members 67 in line with the plane of the covering sheets, and turnbuckle rods 39 adjacent the jacks 47 at the top and bottom of the doorway are secured to the eye-bolts

68. A door frame member 69 of suitable form and construction may be provided. As shown in Fig. 17, the door frame 69 has a face flange 70 covering the turnbuckle rods 38 and jacks 47 and also overlying the angle members 67 at the ends of the covering sheets.

In the construction just described, stressing of the covering sheets 30 and 31 may be accomplished by tightening the turnbuckle rods 38, or by extending the jacks 47, or by conjoint manipulation of the jacks and turnbuckles. This makes it possible to obtain the desired stress in the covering while at the same time avoiding interference between the angle members 67 and the door frame. If, as the rods 38 are tightened, the members 67 come up against the door frame, the jacks 47 may be operated to complete the stressing operations; or, if desired, the turnbuckles 38 and jacks 47 may be so regulated as to bring the members 67 tightly against the door frame 69 just as the desired stress has been secured, thus providing a tight seal between the wall and door frame. Again, the jacks and turnbuckles may be so adjusted as to leave just a small clearance between the members 67 and door frame sufficient to permit the introduction of the desired quantity of mastic sealing compound therebetween. It will be seen that with the construction described, operation of the jacks 47 serves to enlarge the entire supporting framework slightly so as to stress the covering sheets, whereas operation of the turnbuckle rods 38 likewise serves to stress the covering sheets, but by direct action.

My invention also contemplates the stressing of the interior wall covering so as to utilize its strength characteristics in the finished structure. This feature is illustrated in Figs. 16, 18 and 19 which show an interior wall sheet 71 provided with grommeted apertures 72 at intervals which may be spaced in conformity with the spacing of the intersections between the frame members 10 and 17. Bolts 73 or other suitable clamping means pass through the grommets 72 and through apertures in the cross members 18 or vertical members 10. In the joint shown in Fig. 19, the bolt 73 also passes through the plate 22, which was described with reference to Fig. 3. When the bolts 73 are tightened, the wall sheet 71 is drawn outwardly toward the framework of the structure so as to place this sheet under tension and impose additional compressive forces on the frame.

Before the interior wall covering 71 is applied, insulating batts 74 may be placed against the outer wall covering between the uprights 10 as shown in Fig. 18. In some cases it may be preferred to fill the space between the inner and outer wall coverings with insulation in loose form after both coverings are in place.

When the structure is to be employed as a tool supply house, store, or for other purposes, it may be desired to arrange shelving around the inside, and for this purpose, the vertical members 10 may be provided with slots 75 (Fig. 16) for engagement by projections on the shelf supports.

In its preferred form, my invention contemplates the application to the finished structure of coatings of different heat absorptive capacities. For example, in the case of a grain bin or other storage unit where it is desired to reduce the magnitude of convection currents within the structure notwithstanding the provision of a ventilator at the apex of the roof, I paint the roof with a light-colored paint such as aluminum or white, and the side walls with a dark paint which has a greater heat absorptive capacity. Preferably, a plurality of coatings are used such that the color becomes gradually darker toward the bottom of the bin to create a low temperature gradient within the structure dependent upon the differential in heat absorptiveness of the pigment used in the coating. The diminished temperature gradient within the bin results in a more nearly static air condition while at the same time permitting proper ventilation.

In a structure used for houses, the roof will ordinarily be provided with a dark, heat absorptive, coating, and the walls will be made progressively lighter in color so as to be more heat reflective or heat insulating at the bottom. This will create convection currents moving upwardly along the interior walls and ceiling to the ventilator, while cool fresh air will be drawn in around the bottom. Depending upon climatic conditions, it may be desired, however, to utilize in a house the same means as has been described above in connection with storage bins and the like, viz. to provide a structure with roof and walls of heat absorptivity which increases toward the bottom of the structure.

I also contemplate the use of interior coated surfaces having a differential heat emissivity such that the interior heating effect of radiant heat at the outer surfaces of the structure varies from the top to the bottom thereof whereby convection currents within the structure are modified accordingly. For example, the ceiling may be painted a dark hue to provide high heat emissivity, and the interior walls coated with varying hues becoming lighter toward the bottom so as to gradually decrease the heat emissivity factor. This differential in heat emissivity of the interior walls and ceiling may be used either alone, or in conjunction with the differential in heat absorptiveness of the roof and exterior walls. In every case, the coating or coatings are such as to create a differential in the interior heating effect of radiant heat reaching the outer surfaces of the structure, as by direct sunlight or infra red rays, such that this heating effect varies from the top to the bottom of the structure whereby convection currents within are modified accordingly.

It will be understood that the features which I have described in connection with certain embodiments of my invention may be applied to others of the embodiments. For example, the manner of attaching the turnbuckle rods 38 to the ends of the covering sheets, as described with Figs. 16 and 17, may be employed in conjunction with the other structure illustrated in Fig. 9, in which case the turnbuckle rods 39 can be eliminated because there will be no turning moment on the channels 34. The terms and expressions which I have employed are used in a descriptive and not a limiting sense, and I have no intention of excluding such equivalents of the invention described, or of portions thereof, as fall within the purview of the claims.

I claim:

1. A structural unit of the class described comprising a frame-work of compression members arranged to form a support for a continuous polygonal wall, said frame-work comprising peripherally arranged sections and vertically arranged sections, a sheet member wrapped around said frame-work, vertical members secured to the ends of said sheet member, and means disposed between a vertically arranged section of said compression members and one of said vertical members attached to said sheet for adjustably increasing the distance between said vertically arranged section and said vertical member to tighten said sheet member over said frame-work.

2. A structural unit of the class described which comprises a frame-work arranged to form a support for a substantially vertical continuous wall, said frame-work comprising horizontal ring-like members and vertical members, a sheet member wrapped around the periphery of said frame-work, vertical members secured to the ends of said sheet member, screw means for applying a force to at least one of said vertical members secured to the ends of said sheet to bring the sheet ends toward one another, and a brace extending from each of said last-named vertical members to a fixed part of said frame-work to counterbalance the turning moment applied to said vertical members by said screw means.

3. A structural unit of the class described comprising a frame-work arranged to form a support for a continuous polygonal wall, said frame-work comprising peripherally arranged compression sections and spaced vertically arranged sections, a sheet member wrapped around said frame-work with its respective ends spaced apart to form an opening between a pair of adjacent vertically arranged sections, vertical members secured to the ends of said sheet member, and means for drawing said vertical members toward one another to draw said sheet member tightly over said framework, said means comprising a tension element engaging said vertical members and extending across the opening between said pair of adjacent vertically arranged sections, and said means also comprising a compression element disposed between said pair of vertically arranged sections.

RICHARD BUCKMINSTER FULLER.